(12) United States Patent
Miller et al.

(10) Patent No.: US 8,356,087 B1
(45) Date of Patent: Jan. 15, 2013

(54) AUTOMATICALLY CONFIGURING VIRTUAL PRIVATE NETWORKS

(75) Inventors: Kevin C. Miller, Herndon, VA (US); Aparna Nagargadde, Herndon, VA (US)

(73) Assignee: Amazon Technologies, Inc., Reno, NV (US)

(*) Notice: Subject to any disclaimer, the term of this patent is extended or adjusted under 35 U.S.C. 154(b) by 137 days.

(21) Appl. No.: 12/862,412

(22) Filed: Aug. 24, 2010

(51) Int. Cl.
*G06F 15/177* (2006.01)
*G06F 15/173* (2006.01)
(52) U.S. Cl. ........................ 709/220; 709/223
(58) Field of Classification Search .................. 709/220, 709/223
See application file for complete search history.

(56) References Cited

U.S. PATENT DOCUMENTS

| | | | | |
|---|---|---|---|---|
| 7,581,247 B2* | 8/2009 | Sultan | ........................ | 726/12 |
| 7,609,721 B2* | 10/2009 | Rao et al. | ...................... | 370/470 |
| 7,979,521 B2* | 7/2011 | Greaves et al. | ............... | 709/223 |
| 8,031,726 B2* | 10/2011 | Ansari et al. | .................. | 370/401 |
| 2005/0193103 A1* | 9/2005 | Drabik | .......................... | 709/221 |

* cited by examiner

*Primary Examiner* — Asghar Bilgrami
(74) *Attorney, Agent, or Firm* — Thomas | Horstemeyer, LLP (57) ABSTRACT

Disclosed are various embodiments for configuring virtual private networks (VPNs). A request is made, through a service call, for creation of a VPN through a client VPN gateway and a server VPN gateway. In response to the service call, a generic gateway configuration document is received. The generic gateway configuration document is applicable to the client VPN gateway. The generic gateway configuration document is translated to a device-specific gateway configuration document.

21 Claims, 5 Drawing Sheets

AUTOMATICALLY CONFIGURING VIRTUAL PRIVATE NETWORKS

BACKGROUND

A virtual private network (VPN) provides users with private access to an organization's network using a public communication infrastructure, such as the Internet. This privacy is provided by encapsulating data transfers between devices which are not on the same private network. The logical connection between two such devices is known as a VPN tunnel. A VPN may also provide authentication and encryption to keep tunnels secure. Creating a VPN involves configuring network devices on both sides of the connection.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to programmatically configuring a virtual private network (VPN) between a client and a server. A VPN utilizes a VPN gateway device at the client site and another VPN gateway device at the server site. During VPN creation, each of these two devices is provisioned or configured with information about the other. More specifically, in response to a programmatic request by a client to create a VPN, a component at the server site generates a configuration for the client VPN gateway device, where this configuration includes information about the server VPN gateway device. This configuration is provided to the client in a format which is not specific to a particular type of VPN gateway device. The configuration is then translated at the client into a format which is specific to the VPN gateway device used by the client. In the following discussion, a general description of the system and its components is provided, followed by a discussion of the operation of the same.

Figure 1:
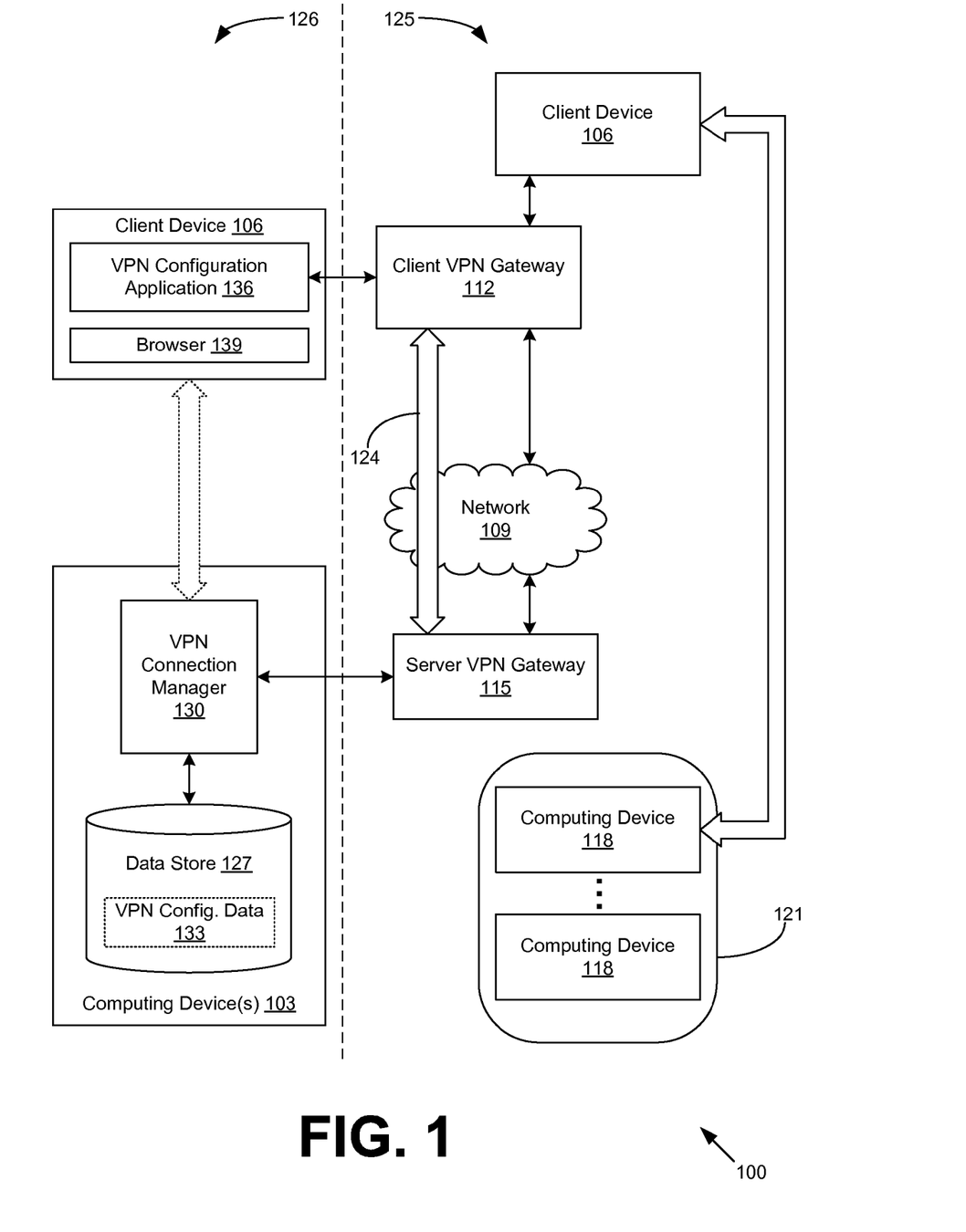
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks. The client device 106 utilizes a virtual private network (VPN) gateway 112 to connect to the network 109. The computing devices 103 also utilize a server VPN gateway 115 to connect to the network 109. The networked environment 100 further includes one or more computing devices 118. The gateways 112, 115 implement a VPN 121, such that the client device 106 can communicate privately with computing devices 118 over a VPN tunnel 124.

The networked environment 100 can be viewed as including a data plane 125 and a control plane 126. The data plane 125 includes the client device(s) 106 and the computing device(s) 116. These components exchange data with each other over the VPN tunnel 124. The control plane 126 includes one client device 106, the computing device 103, the client VPN gateway 112, and the server VPN gateway 115. The control plane 126 is used to configure the data plane 125. More specifically, client device 106 and computing device 103 cooperate to configure the gateways 112 and 115, which enables the data plane 125.

The computing device 103 or 118 may comprise, for example, a server computer or any other system providing computing capability. Alternatively, a plurality of computing devices 103 or 118 may be employed that are arranged, for example, in one or more server banks or computer banks or other arrangements. A plurality of computing devices 118 together may comprise, for example, a cloud computing resource, a grid computing resource, and/or any other distributed computing arrangement. Such computing devices 103 or 118 may be located in a single installation or may be distributed among many different geographical locations. For purposes of convenience, the computing device 103 or 118 is referred to herein in the singular. Even though the computing device 103 or 118 is referred to in the singular, it is understood that a plurality of computing devices 103 or 118 may be employed in various arrangements as described above.

Various applications and/or other functionality may be executed in the computing device 103 according to various embodiments. Also, various data is stored in a data store 127 that is accessible to the computing device 103. The data store 127 may be representative of a plurality of data stores as can be appreciated. The data stored in the data store 127, for example, is associated with the operation of the various applications and/or functional entities described below.

The components executed on the computing device 103, for example, include a virtual private network (VPN) connection manager 130. The components executed on the computing device 103 may also include other applications, services, processes, systems, engines, or functionality not discussed in detail herein. The VPN connection manager 130 is executed to service requests from the client device 106 related to VPN connections. One example of such a request is a request to provide a client configuration that is appropriate for a new VPN connection. The data stored in the data store 127 includes, for example, VPN configuration data 133 used by the VPN connection manager 130, and potentially other data. In various embodiments, the VPN connection manager 130 may utilize any type of middleware framework to communicate with a client application executing on a client device 106. Examples of such frameworks include remote procedure calls, service-oriented architecture protocol (SOAP), representational state transfer (REST), and other frameworks.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other devices with like capability.

The client device 106 may be configured to execute various applications such as a VPN configuration application 136, a browser 139, and/or other applications. The VPN configuration application 136 may be executed in the client device 106 to configure the client VPN gateway 112. The browser 139 may be executed in the client device 106, for example, to access and render network pages, such as web pages, or other network content served up by the computing device 103 and/or other servers. The client device 106 may be configured to execute applications beyond browser 139 such as, for example, email applications, instant message applications, and/or other applications.

Next, a general description of the operation of the various components of the networked environment 100 is provided. To begin, the VPN configuration application 136 (executing on the client device 106) makes a request to the VPN connection manager 130 (executing on the computing device 103) to create a VPN connection. In response to the request, the VPN connection manager 130 returns a gateway configuration document to the VPN configuration application 136. The gateway configuration includes parameters that are needed to establish a VPN connection between the client device 106 and the computing device 103. In some embodiments, the gateway configuration includes all parameters that are needed to establish a VPN connection between the client device 106 and the computing device 103. These parameters are expressed in a manner which is device agnostic (i.e., is not specific to a particular gateway device).

The gateway configuration is translated at the client device 106 into a device specific configuration. This translation may be performed automatically by the VPN configuration application 136, or the user may invoke another application for translation. The device specific configuration is then applied to the client VPN gateway 112. After this application, the client device 106 is part of a VPN which also includes computing device(s) 118. Applying the device specific configuration may be performed automatically by the VPN configuration application 136, or the user may apply the configuration by invoking another application residing on the client device 106 or by executing an application residing on the client VPN gateway 112.

Use of a generic gateway configuration document exists simplifies the process when a user switches from one type of client VPN gateway to another (e.g., from a Cisco® gateway to a Juniper® gateway). In this regard, the VPN configuration application 136 performs the translation process again on the original generic configuration, but specifying a different gateway type. In some embodiments, the VPN configuration application 136 retrieves the same generic document from the VPN connection manager 130. In other embodiments, the VPN configuration application 136 maintains a copy of the original generic gateway configuration.

Figure 2:
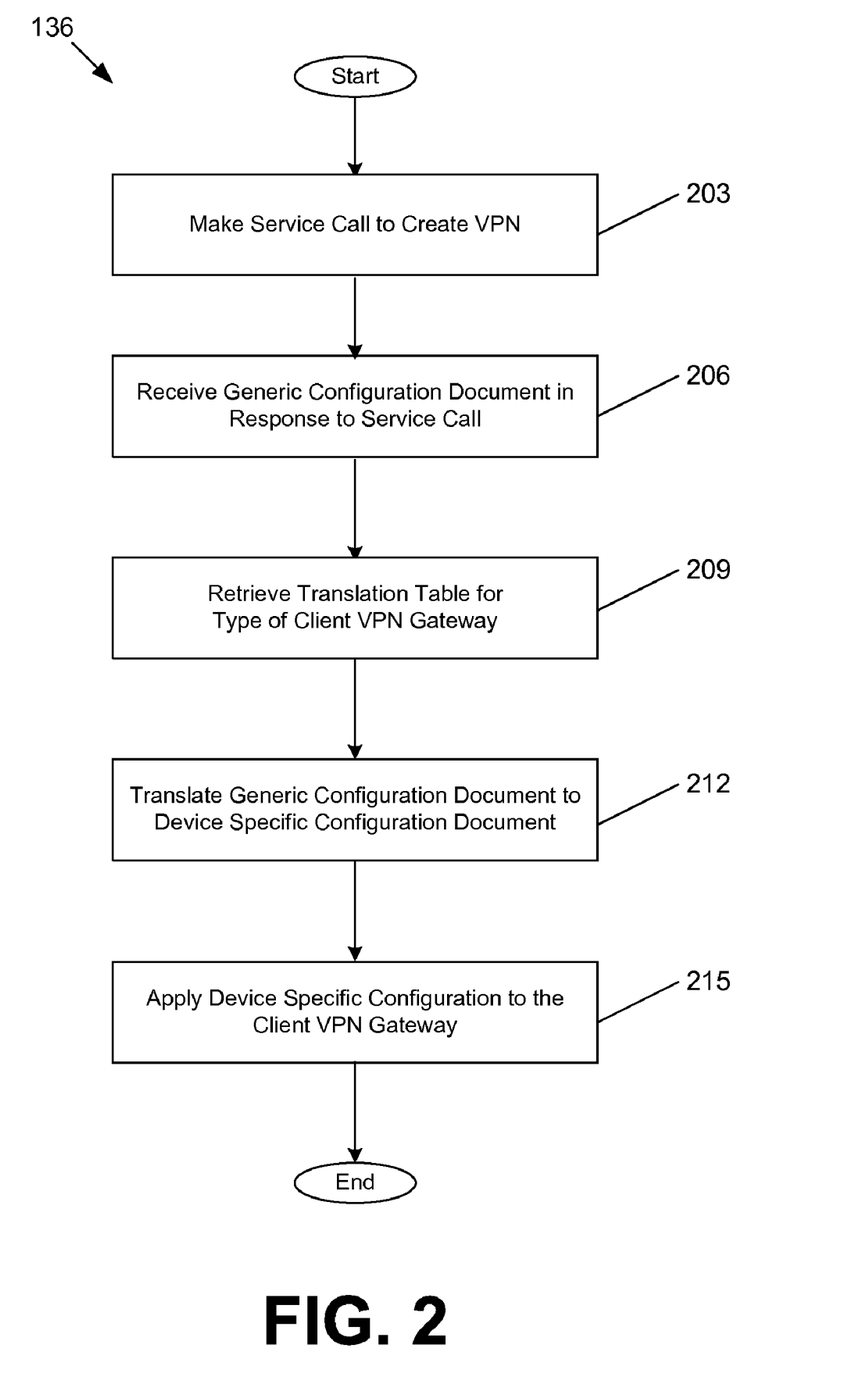
FIG. 2 is a flowchart illustrating one example of functionality implemented as portions of a VPN configuration application executed in a computing device in the networked environment of FIG. 1 according to various embodiments of the present disclosure.

Referring next to FIG. 2, shown is a flowchart that provides one example of the operation of a portion of the VPN configuration application 136 (FIG. 1) according to various embodiments. It is understood that the flowchart of FIG. 2 provides merely an example of the many different types of functional arrangements that may be employed to implement the operation of the portion of the VPN configuration application 136 as described herein. As an alternative, the flowchart of FIG. 2 may be viewed as depicting an example of steps of a method implemented in the computing device 103 (FIG. 1) according to one or more embodiments.

Beginning with box 203, the VPN configuration application 136 (FIG. 1) makes a service call to the VPN connection manager 130 (FIG. 1) to create a VPN. This service call includes various parameters which describe the client VPN gateway 112 (FIG. 1), for example, an externally visible IP address, an autonomous system number (ASN), and the type of gateway. The gateway type may be described, for example, in terms of vendor, product, model, etc. At box 206 the VPN configuration application 136 receives a response to the service call. The response includes a configuration document to be applied to the client VPN gateway 112. The configuration document is a serializable structured document, which may use, for example, Extensible Markup Language (XML), YAML, JSON (Javascript Object Notation), and other such formats. The configuration document is not specific to a particular type of VPN gateway, but is generic so that it applies to many different types of VPN gateways.

The configuration document contains parameters which, when applied to the client VPN gateway 112, result in the creation of a VPN that includes the client device 106 (FIG. 1) and the computing device(s) 118 (FIG. 1). As noted above, a VPN is implemented via one or more tunnels, which may be implemented by Internet Protocol Security (IPsec) tunnels. The configuration document may include, for example, a description of one or more IPSec tunnel interfaces (which receive traffic going to and from the tunnel), IPsec security associations (which handle authentication and/or encryption on a tunnel), Internet Key Exchange (IKE) security associations (used to exchange keys for the IPsec security association), Border Gateway Protocol (BGP) peerings (which exchange routes between the client VPN gateway and the server VPN gateway), and/or other relevant configuration objects.

Next, at box 209 the VPN configuration application 136 determines the type of the client VPN gateway 112 and retrieves a translation table that is specific to the gateway type. At box 212 the VPN configuration application 136 uses this translation table to translate the configuration document that was received in box 206 from a generic document to a document that is specific to the client VPN gateway 112. The device-specific translation table may have been received in response to the service call of box 206. The translation table is a mechanism for mapping a configuration into a series of commands that are specific to a type of client gateway.

In some embodiments which use XML as the format for the generic configuration document, the translation table may take the form of a device-specific style sheet. In such embodiments, an Extensible Stylesheet Language Transformations (XSLT) template processing engine takes as input the received XML configuration document and an XSLT style sheet and produces as output another XML configuration document which is device-specific.

At box 215, the VPN configuration application 136 applies the configuration document produced in box 209 to the client VPN gateway 112. In some embodiments, the VPN configuration application 136 configures the client VPN gateway 112 by sending commands to the client VPN gateway 112. The commands may be sent, for example, through a network interface, a serial interface, or other appropriate interface. In other embodiments, the VPN configuration application 136 invokes a utility program which in turn communicates with the client VPN gateway 112. After box 215, the VPN creation process is complete, and the process ends.

In some embodiments, the VPN configuration application 136 maintains a copy of the original generic gateway configuration. Using this original configuration, the VPN configuration application 136 can translate to a different gateway type, without having to obtain the generic document again from the VPN connection manager 130. This allows the user, for example, to switch from a Cisco® gateway to a Juniper® gateway.

Figure 3:
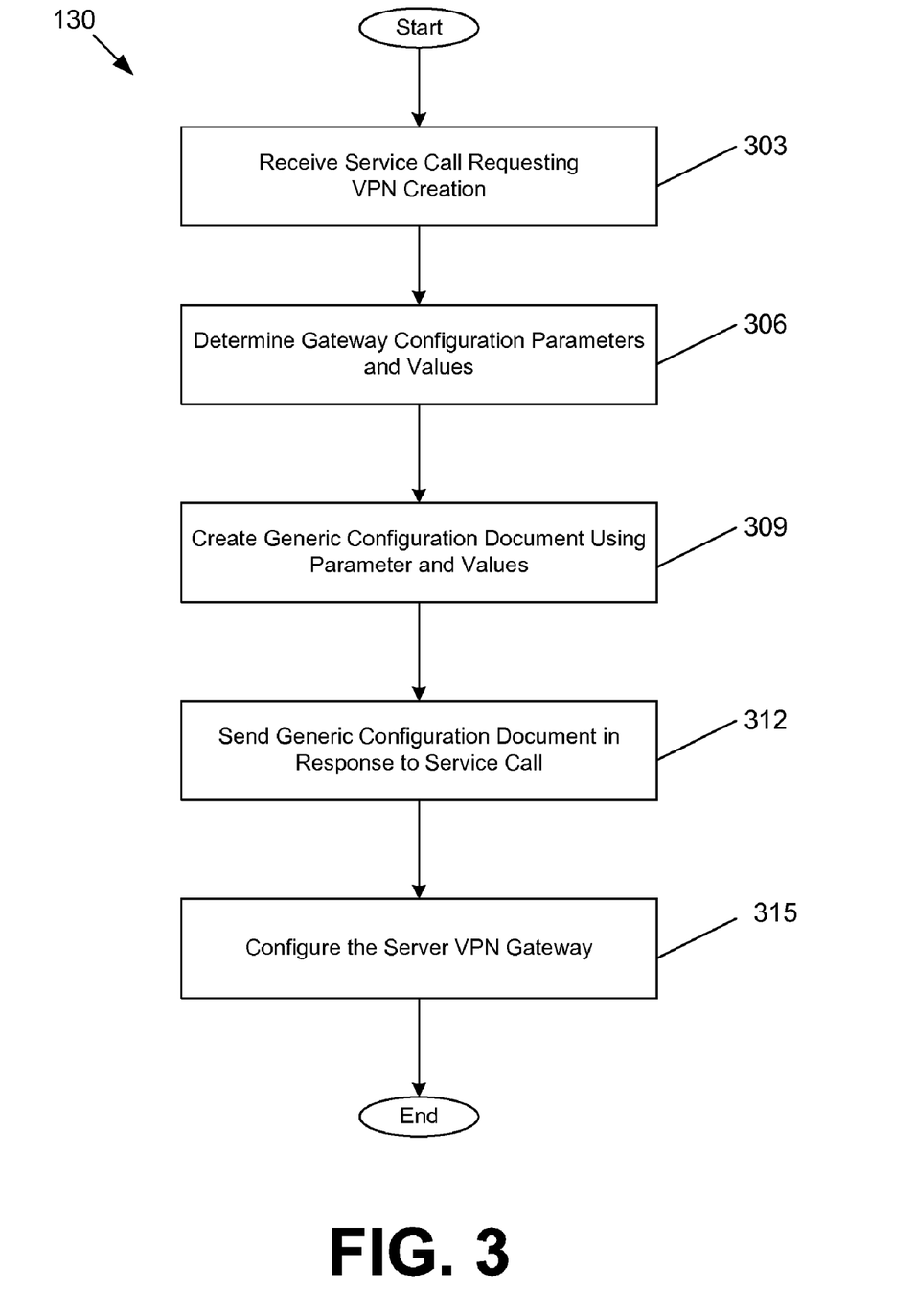
FIGS. 3 and 4 are flowcharts illustrating examples of functionality implemented as portions of a VPN connection manager executed in a computing device in the networked environment of FIG. 1 according to various embodiments of the present disclosure.

Turning now to FIG. 3, shown is a flowchart that provides one example of the operation of a portion of the VPN connection manager 130 (FIG. 1) according to various embodiments. It is understood that the flowchart of FIG. 3 provides merely an example of the many different types of functional arrangements that may be employed to implement the operation of the portion of the VPN configuration application 136 (FIG. 1) as described herein. As an alternative, the flowchart of FIG. 3 may be viewed as depicting an example of steps of a method implemented in the computing device 103 (FIG. 1) according to one or more embodiments.

Beginning with box 303, the VPN connection manager 130 (FIG. 1) receives a service call from the VPN configuration application 136, requesting creation of a VPN. The service call includes parameters describing the client VPN gateway 112 (FIG. 1), for example, an externally visible IP address, an autonomous system number (ASN), and the type of gateway. The gateway type may be described, for example, in terms of vendor, product, model, etc. At box 306, the VPN connection manager 130 uses the service call parameters to determine appropriate configuration parameters for the client VPN gateway 112, as well as appropriate values for these parameters. In making such a determination, the VPN connection manager 130 uses VPN configuration data 133 (FIG. 1) from the data store 127 (FIG. 1), for example, data describing network 109 (FIG. 1), data describing other VPNs for the requesting client, and data describing VPNs for other clients. The VPN connection manager 130 may also use the client gateway type (specified in the create VPN service call) in determining which configuration parameters are appropriate, and/or in choosing appropriate values for these parameters.

Next, at box 309, VPN connection manager 130 uses the configuration parameters and values to create a generic configuration document. This generic configuration document results in the creation of a VPN between the client device 106 and the computing device 103 when applied to the client VPN gateway 112. The configuration document may include, for example, a description for one or more Internet Protocol Security (IPSec) tunnel interfaces, IPsec security associations, Internet Key Exchange (IKE) security associations, Border Gateway Protocol (BGP) peerings, and/or other relevant configuration objects.

At box 312, the VPN connection manager 130 sends the configuration document to the VPN configuration application 136 as a response to the service call received in box 303. The VPN connection manager 130 may additionally send a device-specific style sheet to the VPN configuration application 136, where the device-specific style sheet is selected based on the gateway type parameter of the service call. Having sent the configuration document, the VPN creation process is then complete, and the process ends.

Next, at box 315, the VPN connection manager 130 programmatically configures the VPN server gateway 115 with parameters and values chosen based on the description of the client VPN gateway received in box 303. Once the VPN configuration application 136 has used information in the generic configuration document to configure the VPN client gateway 112, then configuration of the VPN is complete.

Figure 4:
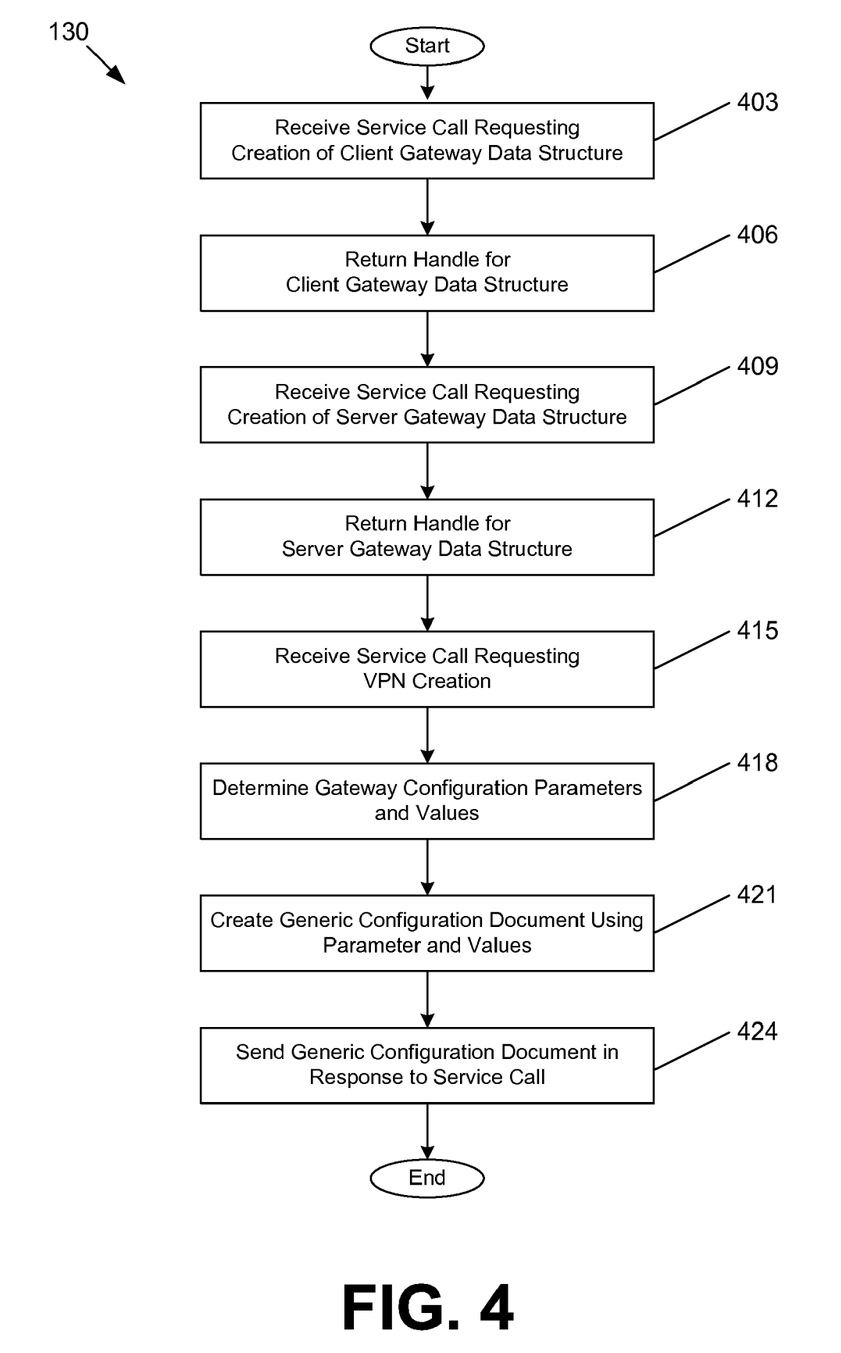

Moving on to FIG. 4, shown is a flowchart that provides another example of the operation of a portion of the VPN connection manager 130 according to various embodiments. In the embodiment described in connection with FIG. 4, the configuration document is created in response to a series of service calls from the VPN configuration application 136. In contrast, the VPN connection manager 130 described in connection with FIG. 3 creates a configuration document in response to a single service call from the VPN configuration application 136. It is understood that the flowchart of FIG. 4 provides merely an example of the many different types of functional arrangements that may be employed to implement the operation of the portion of the VPN configuration application 136 as described herein. As an alternative, the flowchart of FIG. 4 may be viewed as depicting an example of steps of a method implemented in the computing device 103 (FIG. 1) according to one or more embodiments.

Beginning with box 403, the VPN connection manager 130 receives a service call from the VPN configuration application 136, requesting creation of a data structure describing the client VPN gateway 112. The service call includes parameters describing the client VPN gateway 112, for example, an externally visible IP address and an autonomous system number (ASN). At box 406, the VPN connection manager 130 returns to the VPN configuration application 136 a handle or identifier for the client gateway data structure. Next, at box 409 the VPN connection manager 130 receives a service call from the VPN configuration application 136, requesting creation of a data structure describing the server VPN gateway 115. At box 412, the VPN connection manager 130 returns to the VPN configuration application 136 a handle or identifier for the server gateway data structure. At box 415 the VPN connection manager 130 receives a service call from the VPN configuration application 136, requesting creation of a VPN. The service call includes the handle of the client gateway data structure, the handle of the server gateway data structure and the type of gateway. The gateway type may be described, for example, in terms of vendor, product, model, etc. In some embodiments, the VPN connection manager 130 also validates the parameters in the service calls of box 403, 409 and 415, and returns an error code back to the VPN configuration application if the validation fails.

At box 418, the VPN connection manager 130 uses the service call parameters to determine appropriate configuration parameters, and values for these parameters, for the client VPN gateway 112. In making such a determination, the VPN connection manager 130 uses VPN configuration data 133 from the data store 127, for example, data describing network 109, data describing other VPNs for the requesting client, and data describing VPNs for other clients. The VPN connection manager 130 may also use the client gateway type (specified in the create VPN service call) in determining which configuration parameters are appropriate, and/or in choosing appropriate values for these parameters.

Next, at box 421, VPN connection manager 130 uses the configuration parameters and values to create a generic configuration document. This generic configuration document results in the creation of a VPN between the client device 106 and the computing device 103 when applied to the client VPN gateway 112. The configuration document may include, for example, a description of one or more IPSec tunnel interfaces, IPsec security associations, IKE security associations, BGP peerings, and/or other relevant configuration objects. At box 424, the VPN connection manager 130 sends the configuration document to the VPN configuration application 136 as a response to the service call received in box 415. The VPN creation process is complete, and the process ends.

Figure 5:
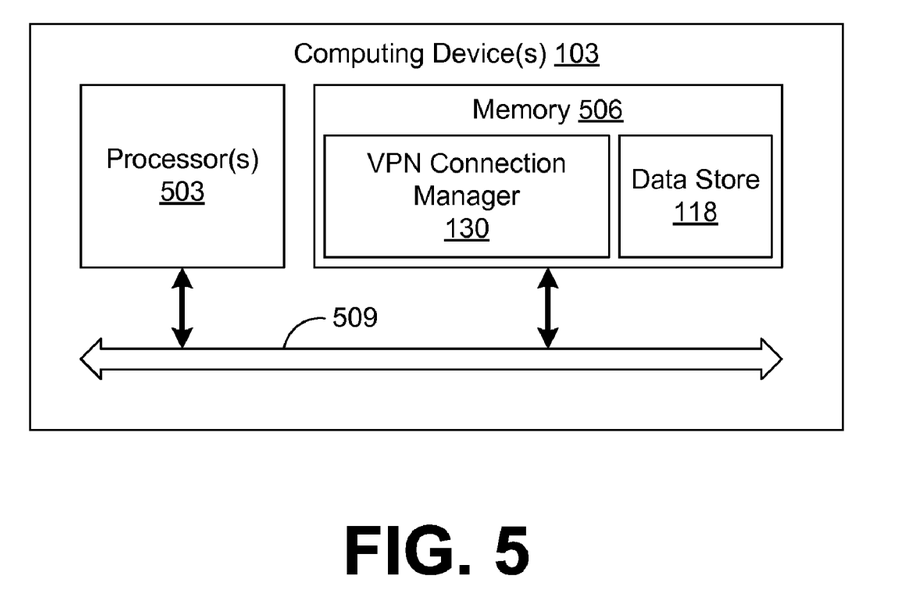
FIG. 5 is a schematic block diagram that provides one example illustration of a computing device employed in the networked environment of FIG. 1 according to various embodiments of the present disclosure.

Referring next to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the VPN connection manager 130 and potentially other applications. Also stored in the memory 506 may be a data store 127 and other data. In addition, an operating system may be stored in the memory 506 and executable by the processor 503.

Figure 6:
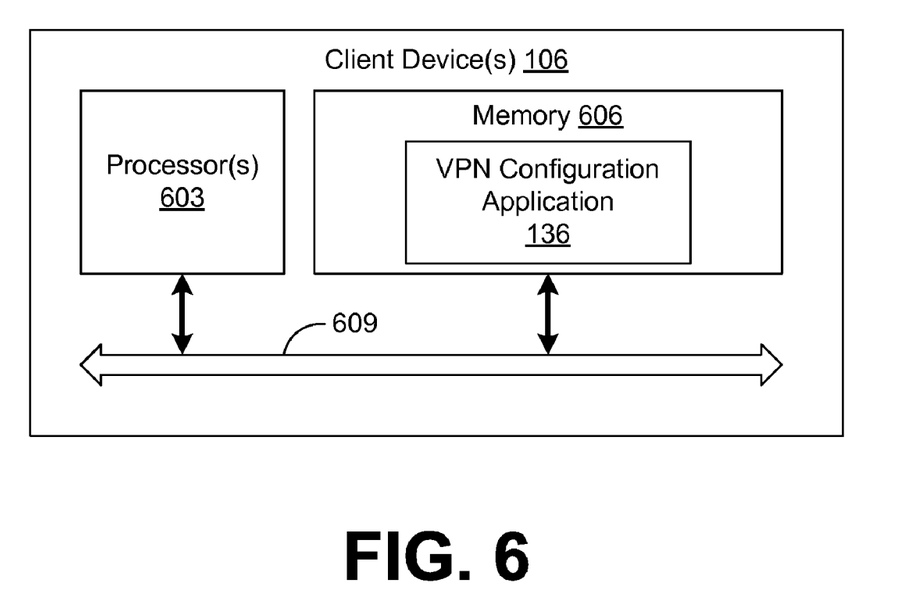
FIG. 6 is a schematic block diagram that provides another example illustration of a computing device employed in the networked environment of FIG. 1 according to various embodiments of the present disclosure.

Turning now to FIG. 6, shown is a schematic block diagram of the client device 106 according to an embodiment of the present disclosure. The client device 106 includes at least one processor circuit, for example, having a processor 603 and a memory 606, both of which are coupled to a local interface 609. To this end, the client device 106 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the VPN configuration application 136 and potentially other applications. In addition, an operating system may be stored in the memory 606 and executable by the processor 603.

It is understood that there may be other applications that are stored in the memory 506 or 606 and are executable by the processors 503 or 603 as can be appreciated. Where any component discussed herein is implemented in the form of software, any one of a number of programming languages may be employed such as, for example, C, C++, C#, Objective C, Java, Javascript, Pen, PHP, Visual Basic, Python, Ruby, Delphi, Flash, or other programming languages.

A number of software components are stored in the memory 506 or 606 and are executable by the processor 503 or 603. In this respect, the term "executable" means a program file that is in a form that can ultimately be run by the processor 503 or 603. Examples of executable programs may be, for example, a compiled program that can be translated into machine code in a format that can be loaded into a random access portion of the memory 506 or 606 and run by the processor 503 or 603, source code that may be expressed in proper format such as object code that is capable of being loaded into a random access portion of the memory 506 or 606 and executed by the processor 503 or 603, or source code that may be interpreted by another executable program to generate instructions in a random access portion of the memory 506 or 606 to be executed by the processor 503 or 603, etc. An executable program may be stored in any portion or component of the memory 506 or 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 or 606 is defined herein as including both volatile and nonvolatile memory and data storage components. Volatile components are those that do not retain data values upon loss of power. Nonvolatile components are those that retain data upon a loss of power. Thus, the memory 506 or 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 or 603 may represent multiple processors and the memory 506 or 606 may represent multiple memories that operate in parallel processing circuits, respectively. In such a case, the local interface 509, 609 may be an appropriate network 109 (FIG. 1) that facilitates communication between any two of the multiple processors 503 or 603, between any processor 503 or 603 and any of the memories 506 or 606, or between any two of the memories 506 or 606, etc. The local interface 509, 609 may comprise additional systems designed to coordinate this communication, including, for example, performing load balancing. The processor 503 or 603 may be of electrical or of some other available construction.

Although VPN connection manager 130, VPN configuration application 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the VPN connection manager 130 and the VPN configuration application 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 or 603 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including VPN connection manager 130 and VPN configuration application 136, that comprises software or code can be embodied in any non-transitory computer-readable medium for use by or in connection with an instruction execution system such as, for example, a processor 503 or 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising the steps of:
   requesting, through a first service call, creation of a data structure describing a server virtual private network (VPN) gateway;
   receiving, in response to the first service call, a handle for the server VPN gateway;
   requesting, through a second service call, creation of a data structure describing a client VPN gateway;
   receiving, in response to the second service call, a handle for the client VPN gateway;
   requesting, through a third service call, creation of a VPN that includes the client VPN gateway and the server VPN gateway;
   receiving, in response to the third service call, a generic gateway configuration document;
   translating the generic gateway configuration document to a device-specific gateway configuration document; and
   applying the device-specific gateway configuration document to the client VPN gateway.

2. The method of claim 1, wherein the generic gateway document is an Extensible Markup Language (XML) document.

3. The method of claim 2, wherein the translating applies an XML stylesheet to the generic gateway document to produce the device-specific gateway configuration document.

4. The method of claim 2, wherein the applying uses a command line interface to the client VPN gateway.

5. A system, comprising:
   at least one computing device; and
   a virtual private network (VPN) configuration manager executable in the at least one computing device, the VPN configuration manager comprising:
      logic that receives a service call requesting creation of a VPN which uses a client VPN gateway and a server VPN gateway, wherein the service call includes a description of the client VPN gateway; and
      logic that sends, in response to the service call, a generic configuration document, wherein contents of the generic configuration document are based at least on the description of the client VPN gateway.

6. The system of claim 5, further comprising logic that creates the generic configuration document based at least on the description of the client VPN gateway.

7. The system of claim 5, further comprising:
   logic that, in response to the service call, determines at least one configuration parameter and a corresponding value based at least on the description of the client VPN gateway; and
   logic that creates the generic configuration document based at least on the determined at least one configuration parameter and the corresponding value.

8. The system of claim 5, further comprising logic that retrieves information about the server VPN gateway from a data store, wherein the contents of the generic configuration document are further based on the retrieved information.

9. The system of claim 5, further comprising logic that, in response to the service call, configures the server VPN gateway based at least on the description of the client VPN gateway.

10. The system of claim 5, further comprising: logic that, in response to the service call, communicates at least one configuration parameter and corresponding value to the server VPN gateway, the at least one configuration parameter and the corresponding value based at least on the description of the client VPN gateway.

11. The system of claim 5, further comprising logic that creates the generic configuration document based at least on the description of the client VPN gateway.

12. The system of claim 5, further comprising logic that validates parameters of the service call.

13. A method, comprising the steps of:
   requesting, through a service call, creation of a virtual private network (VPN) through a VPN client gateway and a VPN server gateway;
   receiving, in response to the service call, a generic gateway configuration document applicable to the VPN client gateway; and
   translating the generic gateway configuration document to a device-specific gateway configuration document.

14. The method of claim 13, further comprising the step of applying the device-specific gateway configuration document to the client VPN gateway.

15. The method of claim 13, further comprising the step of applying the device-specific gateway configuration document to the client VPN gateway through a command line interface to the client VPN gateway.

16. The method of claim 13, further comprising the step of applying the device-specific gateway configuration document to the client VPN gateway by invoking a program executing on the client VPN gateway.

17. The method of claim 13, wherein the translating comprises applying a device-specific translation table to the generic gateway configuration document.

18. The method of claim 17, further comprising the step of receiving the device-specific translation table.

19. The method of claim 17, further comprising the step of receiving the device-specific translation table in response to the service call.

20. The method of claim 13, wherein the generic gateway document is an Extensible Markup Language (XML) document.

21. The method of claim 13, wherein the translating applies a device-specific translation table to the generic gateway configuration document to produce the device-specific gateway configuration document.

* * * * *